(12) United States Patent
Brandl et al.

(10) Patent No.: US 9,156,058 B2
(45) Date of Patent: Oct. 13, 2015

(54) METHOD FOR PRODUCING A COMPONENT

(71) Applicant: EADS Deutschland GmbH, Ottobrunn (DE)

(72) Inventors: Erhard Brandl, Eitensheim (DE); Joerg Sander, Ulm (DE); Achim Schoberth, Taufkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 106 days.

(21) Appl. No.: 13/923,120

(22) Filed: Jun. 20, 2013

(65) Prior Publication Data

US 2013/0280547 A1    Oct. 24, 2013

Related U.S. Application Data

(63) Continuation of application No. PCT/DE2011/002102, filed on Dec. 12, 2011.

(30) Foreign Application Priority Data

Dec. 20, 2010 (DE) .......................... 10 2010 055 201

(51) Int. Cl.
| | |
|---|---|
| *B32B 5/16* | (2006.01) |
| *B05D 3/06* | (2006.01) |
| *B22F 3/105* | (2006.01) |
| *C22C 26/00* | (2006.01) |

(52) U.S. Cl.
CPC *B05D 3/06* (2013.01); *B05D 3/065* (2013.01); *B22F 3/1055* (2013.01); *B32B 5/16* (2013.01); *C22C 26/00* (2013.01); *Y10T 428/12014* (2015.01); *Y10T 428/12146* (2015.01)

(58) Field of Classification Search
USPC .................................... 75/243, 245; 428/408
See application file for complete search history.

(56) References Cited

U.S. PATENT DOCUMENTS

| | | | | |
|---|---|---|---|---|
| 4,639,281 | A | * | 1/1987 | Sastry et al. .................. 148/407 |
| 5,011,514 | A | * | 4/1991 | Cho et al. ......................... 51/309 |
| 5,093,148 | A | * | 3/1992 | Christodoulou et al. . 219/137 R |
| 5,433,280 | A | * | 7/1995 | Smith ............................ 175/336 |
| 5,834,689 | A |   | 11/1998 | Cook |

(Continued)

OTHER PUBLICATIONS

Blum et al "Liquid-phase sintering of nanodiamond composite coatings on aluminum A319 using a focused laser beam" Suface & Coatings Technology 204 (2009) 1-14.*

(Continued)

*Primary Examiner* — Archene Turner
(74) *Attorney, Agent, or Firm* — Crowell & Moring LLP (57) ABSTRACT

A method for manufacturing a component having increased thermal conductivity through layer-by-layer construction. At least one section of the component is constructed by applying a layer section having predetermined dimensions of a composite material of a metal and/or a metal alloy and particles of a highly heat-conducting material, including diamond and/or cubic boron nitride, in a predetermined area on a base layer by melting the metal or the metal alloy a heat source, in such a way that the metal and/or metal alloy form(s) within the predetermined dimensions a cohesive matrix, in which particles of the highly heat-conducting material are embedded, and then cooling.

15 Claims, 6 Drawing Sheets

(56) References Cited

U.S. PATENT DOCUMENTS

| | | | |
|---|---|---|---|
| 6,335,086 B1 * | 1/2002 | Veerasamy | 428/408 |
| 6,402,438 B1 * | 6/2002 | Boyer | 408/144 |
| 6,454,030 B1 * | 9/2002 | Findley et al. | 175/425 |
| 6,458,471 B2 * | 10/2002 | Lovato et al. | 428/568 |
| 6,742,611 B1 * | 6/2004 | Illerhaus et al. | 175/433 |
| 7,279,023 B2 * | 10/2007 | Pickard et al. | 428/539.5 |
| 7,497,280 B2 * | 3/2009 | Brackin et al. | 175/433 |
| 8,317,893 B2 * | 11/2012 | Stevens et al. | 75/243 |
| 8,318,082 B2 * | 11/2012 | Can et al. | 51/307 |
| 8,790,438 B2 * | 7/2014 | Millar et al. | 75/246 |
| 8,936,117 B2 * | 1/2015 | Vail | 75/243 |
| 2005/0074355 A1 | 4/2005 | Pickard et al. | |

OTHER PUBLICATIONS

S. Vaucher et al., "Selective Laser Sintering of Aluminium-Silicon Carbide Metal Matrix Composites", Material Week, Oct. 2, 2002, pp. 1-8, XP55024712.

Matthew Wong et al., "Pressure Loss and Heat Transfer Through Heat Sinks Produced by Selective Laser Melting", Heat Transfer Engineering, Nov. 1, 2009, pp. 1068-1076, vol. 30, No. 13, XP008150615.

German-language Office Action dated Apr. 26, 2013 (Five (5) pages).

German-language Written Opinion dated Apr. 27, 2012 (Seven (7) pages).

International Search Report dated Apr. 27, 2012 with English translation (Eight (8) pages).

* cited by examiner

METHOD FOR PRODUCING A COMPONENT

CROSS-REFERENCE TO RELATED APPLICATIONS

The present application is a continuation of PCT International Application No. PCT/DE2011/002102, filed Dec. 12, 2011, and claims priority under 35 U.S.C. §119 to German Patent Application No. 10 2010 055 201.1, filed Dec. 20, 2010, the entire disclosure of these applications is herein expressly incorporated by reference.

FIELD OF THE INVENTION

Exemplary embodiments of the present invention relate to a method for manufacturing a component having an increased thermal conductivity through layer-by-layer construction and a composite material, i.e., a laminated material manufactured layer by layer, a component that can be manufactured by this method and a composite material that can be manufactured by this method.

BACKGROUND OF THE INVENTION

Many industrial components and processes, for example, electronic components and processes, require a rapid and reliable removal of heat during operation in order to prevent overheating and therefore damage or to ensure satisfactory operation of the components or the process. Many components or systems of components such as laser crystals or laser transmitters that are used in satellites require an extremely stable temperature. If convection cooling is impossible and radiant cooling is inadequate, the heat must be dissipated by thermal conduction of suitable heat-conducting materials.

Heat sinks made of alloys based on the best heat-conducting materials, i.e., copper (Cu), silver (Ag) and gold (Au), are usually manufactured for dissipating heat. These metals have a thermal conductivity in the range of 350-400 W/mK. However, the density of Ag, Cu and Au is comparatively high, namely greater than 9 g/cm$^3$, so that heat sinks made of these metals definitely increase the total weight of a device containing them, which is often undesirable. Alloys based on aluminum (Al) have a much lower density (approximately 2.7 g/cm$^3$) but also have a lower thermal conductivity, as low as approximately 220 W/mK at most.

Metal-diamond composite materials having a higher thermal conductivity than the base metal are also known. These materials are produced by infiltration of molten metal into the entire powder bed of a diamond powder or into the entire diamond particle preforms. First, the metal on the preform or the powder bed of diamond is melted in vacuo. Then the melt infiltrates into the powder bed or the preform under the influence of a gas under pressure. However, only elements having a simple and usually flat geometry can be manufactured economically in this way because the mechanical processing or machining of such a composite material is extremely difficult, time-consuming and expensive.

Furthermore, it is known that a component made of metal or a metal alloy can be manufactured in a layer-by-layer construction (also known as a generative production process, rapid prototyping, rapid manufacturing or additive layer manufacturing (ALM)). In this method, a three-dimensional CAD model is cut digitally into thin slices. The digital data is then fed into a control unit, which in turn controls a heat source and the supply of powdered material from which the component is constructed layer by layer in a shape approaching the final contour (English: "near net shape"). The basic principle of construction of a layer is performed by continuous local deposition of metal or a metal alloy in the form of powder or by melting a wire or rod made of the metal or metal alloy, so that the metal or metal alloy is melted and then cooled again by a movable heat source (e.g., a laser or electron beam or electric arc).

Those skilled in the art are familiar with various methods for applying a layer with the help of a powder bed, known in English as direct metal laser sintering (DMLS), selective laser sintering (SLS), selective electron beam melting (SEBM), LaserCusing or selective laser melting (SLM). Those skilled in the art are also familiar with this method of applying a layer by surfacing welding with the aid of a powder feed is known in English as direct metal deposition (DMD), laser engineered net shaping (LENS), laser rapid forming (LRF) or laser cladding (LC).

SUMMARY OF THE INVENTION

Exemplary embodiments of the present invention are directed to creating a highly heat-conducting structure in a near net shape.

This is made possible by a method for manufacturing a component having an increased thermal conductivity by layer-by-layer construction and involves constructing at least one section of the component by performing a step at least once, the step comprising at least the following:

a) applying a layer section having predetermined dimensions of a composite material of a metal and/or a metal alloy and particles of a highly heat-conducting material, comprising diamond and/or cubic boron nitride, in a predetermined area on a base layer by melting the metal or the metal alloy by means of a heat source in such a way that the metal and/or metal alloy form(s) a cohesive matrix within the predetermined dimensions, in which particles of the highly heat-conducting material are embedded, and then cooling, with the provision that the metal is not selected from the alkaline metals and calcium, strontium, barium and radium, unless it is a component of the metal alloy.

In an expedient embodiment, the method involves the application of the layer section to the base layer by one of the following steps 1) through 4), comprising:

1) providing a powder bed of a mixture of powdered metal and/or metal alloy particles and particles of the highly heat-conducting material, comprising diamond and/or cubic boron nitride and/or a mechanical alloy of the metal and/or metal alloy and particles of the highly heat-conducting material on the base layer and melting the metal and/or metal alloy in a subarea of the powder bed having predetermined dimensions by means of a heat source, in such a way that the metal and/or metal alloy form(s) a cohesive matrix within the predetermined dimensions, in which the particles of the highly heat-conducting material are embedded, and then cooling;

2) supplying powdered metal and/or metal alloy particles and particles of the highly heat-conducting material, comprising diamond and/or cubic boron nitride and/or a powdered mechanical alloy of the metal and/or metal alloy and particles of the highly heat-conducting material by means of one or more nozzles onto a predetermined area of the substrate and melting the metal and/or metal alloy by means of a heat source, in such a way that the metal and/or metal alloy form(s) a cohesive matrix within the predetermined dimensions, in which the particles of the highly heat-conducting material are embedded, and then cooling;

3) having a heat source act on one end of a hollow metal and/or metal alloy wire or tube, in the cavity of which particles of the highly heat-conducting material, comprising diamond and/or cubic boron nitride and/or the mechanical alloy of the metal and/or metal alloy and particles of the highly heat-conducting material are arranged in such a way that the portion of the metal and/or metal alloy wire or tube on which the heat source acts then melts and forms a cohesive matrix within a predetermined area, in which the particles of the highly heat-conducting material are embedded, and then cooling;

4) supplying a powder bed of powdered particles of the highly heat-conducting material, comprising diamond and/or cubic boron nitride and a wire or rod of the metal or the metal alloy, having a heat source act on one end of the wire or rod in such a way that the portion of the wire or rod on which the heat source acts is melted and, as a melt, infiltrates a predetermined section of the powder bed of the highly heat-conducting material and surrounds its particles in the form of a cohesive matrix, and then cooling.

Exemplary embodiments of the present invention also involve a method for manufacturing a composite material consisting of a metal and/or a metal alloy and particles of a highly heat-conducting material, comprising diamond and/or cubic boron nitride, comprising the preceding process step a) and preferably the preceding process steps 1) through 4) and optionally the additional process steps described herein for the production of the component, except for those relating to the production of other materials in addition to the components comprising the composite material, and then separating the base layer which does not consist of the composite material, wherein in the case in which the highly heat-conducting material does not comprise cubic boron nitride, at least one additional layer section of composite material is applied to a base layer comprising the previously applied layer section of the composite material.

Furthermore, exemplary embodiments of the present invention relate to a heat-conducting, near-net shape component that can be manufactured by the first method defined above, and a composite material of a metal and/or a metal alloy and particles of a highly heat-conducting material, comprising diamond and/or cubic boron nitride, the composite material being manufacturable by the second method defined above.

DETAILED DESCRIPTION

Metals are advantageous as heat-conducting materials inasmuch as they can be processed easily by a variety of methods to all desired shapes, among other things, through generative production, i.e., additive manufacturing of components as mentioned at the outset. However, they have a limited thermal conductivity in comparison with some nonmetallic heat-conducting substances whose lattices have covalent bonds.

The metals with the highest thermal conductivity are Ag, Cu and Au, which have a thermal conductivity of 419 W/mK, 385 W/mK and 320 W/mK, respectively. However, the thermal conductivity of aluminum, which is of interest because of its low density, among other reasons, is only 230 W/mK, and its specific thermal conductivity, i.e., its density-related thermal conductivity (87 W/m/K/g/cm$^3$) is twice as high as that of Cu.

Of the isotropic heat-conducting nonmetallic substances, diamond has the highest thermal conductivity (up to 2300 W/mK), followed by cubic boron nitride (approximately 1700-1750 W/mK).

However, pure diamond and pure cubic boron nitride (hereinafter: cBN) cannot in general be processed to form components at a reasonable cost.

Composite materials of Ag, Cu or Al matrix material and diamond are known and have thermal conductivity values higher than those of the matrix metals. However, as already mentioned at the outset, their structures are limited to simple shapes due to the production process because of the difficulty of mechanical processing.

It has now surprisingly been found that a mixture (in the broadest sense) of diamond and/or cBN containing highly heat-conducting material and metal and/or a metal alloy is as suitable as pure metal or a pure metal alloy for processing in a generative manufacturing process (or layer-by-layer construction or ALM) and thus even complex structures can be manufactured in near net shape using such composite materials.

In general terms, a mixture with predetermined dimensions is created locally in a thin layer on a predetermined area of a base layer, the mixture comprising a molten metal or metal alloy matrix (hereinafter referred to collectively as "metal matrix") with diamond and/or cBN particles embedded in it. After cooling, this yields a layer section of a structure of composite material, comprising a metal or metal alloy matrix with embedded diamond or cBN particles.

This procedure may be repeated at least once as needed on the layer comprising or consisting of the layer section of composite material as formed above. As a rule, this procedure is repeated several additional times, for example, approximately 5 times, approximately 10 times, approximately 20 times, approximately 100 times or even more often until the layers comprising or consisting of the sections of composite material have reached the desired total thickness or geometry.

The base area of the layer section of composite material formed on the base layer is often smaller than the base area of the base layer, for example, comprising approximately 90% or less, 75% or less, approximately 50% or less, approximately 25% or less, approximately 10% or less, approximately 1% or less, approximately 0.1% or even less of the base area of the base layer. This is particularly true when the base layer is the lowest base layer of the component, i.e., usually the construction platform. In particular this is true of embodiment 4, which is discussed below with reference to FIG. 4.

The smallest possible base area of the layer section, i.e., the finest structure that can be produced, depends in particular on the size of the light spot or beam spot of the heat source used, so that the particle size of the highly heat-conducting material may also play a role. Depending on the process variant used, its particle size is often in the range of approximately 200 μm$^2$ to approximately 4 mm$^2$.

The metal(s) used in the method according to the invention may be selected from any of the metals of the periodic system if it is/they are present in the form of an element, not including the alkali metals plus calcium, barium, strontium and radium. Metal alloys may, however, contain the latter elements.

Preferred metals include Al, Cu, Ag, Au, titanium (Ti), magnesium (Mg), zinc (Zn), tin (Sn) and iron (Fe). Metal alloys based on Al, Cu, Ag, Au, Ti, Mg, Zn, Sn and/or Fe, i.e., conventional material groups such as brass, bronze and steel are also preferred.

The term "metal alloy" is understood to be an alloy containing primarily at least two different metals such as brass or bronze, but also an alloy containing not only metals but also small amounts of non-metals such as carbon (C), nitrogen (N) or phosphorus (P), as is the case with certain steels, for example.

"Cooling" within the context of this patent application means that the temperature of the mixture is reduced until it solidifies. This usually takes place by simple exposure to ambient temperature but may optionally be accomplished by active cooling using a liquid coolant, for example.

The metal and/or metal alloy (referred to below collectively as "metal") forming the matrix is (are) melted with the aid of a heat source, which is preferably movable, so that the underlying composite material layer or other base layer is melted (unless it cannot be melted under these conditions). This is desirable because the layers adhere to one another in this way.

Formation of a molten metal matrix or metal alloy matrix (hereinafter referred to collectively as "metal matrix") with diamond and/or cBN particles embedded therein and the subsequent cooling in an adjacent area on the same base layer is often repeated to create a structure of a composite material having the desired dimensions.

In the case of the preferably movable heat source, it may be, for example, a laser beam, a UV light, a particle beam (e.g., ion beam), an electron beam or an electric arc (the metal matrix being at ground in the two latter cases). The laser wavelengths may be in any wavelength range that is absorbed by the metal. Examples include a $CO_2$ laser, an Nd:YAG laser or a UV laser.

The power output to the heat source may be either continuous or in pulses. The power density of the heat source depends on the energy demand for melting the metal. It is generally on the order of 10 kW/cm$^2$ to 100 kW/cm$^2$.

When using a laser beam, UV light or an electric arc as the heat source, an inert gas, such as a noble gas or nitrogen, must be used as the protective gas or protective atmosphere. Work is performed in vacuo, if necessary, when using an electron beam or a particle beam (e.g., ion beam).

In general, the method is performed so that step a) above or one of the above steps 1) through 4) using a movable heat source is performed continuously on the same base layer with continuous power output by the heat source or in the case of pulsed power output by the heat source, the step is repeated continuously as many times as needed to achieve a predetermined dimension of the layer section.

Multiple abutting or separate layer sections of the same composite material may optionally also be applied to the same base layer by different process variants corresponding to steps 1) through 4) above.

The method according to the invention may be performed at an ambient temperature of room temperature (approximately 20° C. to approximately 26° C. in general) or, at least during some of the process, an elevated temperature in the range of approximately 30% to approximately 60% of the solidus line (° C.) of the metal or of the metal alloy. In the latter case, the component is generally allowed to cool to room temperature after being manufactured. It is preferable to work at the elevated temperature in particular when components with thin walls are to be produced. Without being bound to any one theory, it is assumed that inherent stresses and deformation of the components are minimized in this way due to the reduction in temperature differences in the construction space and the structure/microstructure of the composite material can be adjusted as needed in accordance with demand by reducing the solidification rate.

The diamond and/or cBN particles used in the process according to the invention in general have the longest length dimensions, at least 95% of which are within the range of approximately 4 μm to approximately 500 μm, where a range from approximately 6 μm to approximately 200 μm, for example, approximately 6 μm to approximately 60 μm, from approximately 50 μm to approximately 350 μm or from approximately 60 μm to approximately 200 μm may be preferred, depending on the embodiment of the method used. The size distribution may be monomodal but is preferably bimodal or trimodal to ensure a denser packing of the diamond and/or cBN particles.

If the metal or metal alloy is used in the form of particles that are melted, then the longest length dimension of at least 95% of the particles is in the range of approximately 10 μm or approximately 20 μm to approximately 400 μm, preferably approximately 30 μm to approximately 120 μm.

The cohesive metal matrix must not have any cavities in the ready-to-use component because cavities would have a negative effect on the thermal conductivity.

Good wetting and adhesion of the diamond and/or cBN particles by and/or on the metal is also essential for a good thermal conductivity of the composite material. To this end, the surface of diamond and/or cBN crystals may be partially etched or roughened by a heat treatment in an oxidizing atmosphere at moderately high temperatures (e.g., 800° C.). The wetting of the surface by the metal and adhesion to same may also be improved by certain coatings on the surface of the diamond and/or cBN particles, e.g., with SiC or AlN. Particularly in this case the heat treatment of the composite material post production, as explained below, may be unnecessary.

The conversion of diamond and cBN to graphite and hexagonal boron nitride, respectively, begins at approximately 1500-1600° C. under atmospheric pressure. This phase change begins at the surface of the crystal with external heating on all sides and then progresses into the interior. If the diamond or cBN crystal is heated at this temperature or higher for only a very brief period of time, then the conversion will usually take place only to a negligible extent. Furthermore, coated crystals (e.g., with SiC, AlN) may advantageously be used in such cases.

At elevated temperatures, cBN may also react with certain metals. Here again, a brief heating period at such temperatures as well as an oxidic passivation or passivation through coating of the surface, for example, may also be recommended.

In the event the metal matrix still has defects, e.g., cavities, and/or to improve the adhesion of the metal to the surface, the composite material may also be subjected to a heat treatment at atmospheric pressure or in vacuo or even at an elevated pressure ("hot pressing" or "hot isostatic pressing").

The heat treatment is generally performed at temperatures from approximately 40% to 80%, often approximately 55% of the melting point (in ° C.) of the metal. The period of time may be a few minutes to several hours when working at atmospheric pressure. In the case of a heat treatment by hot isostatic pressing, which is usually performed for approximately 1 hour to approximately 4 hours, pressures of the protective gas of approximately 50 MPa to approximately 200 MPa are generally used. The success of the heat treatment (i.e., improvement in adhesion of the metal to the surface of the highly heat-conducting material and freedom from defects in the metal matrix) can be monitored by electron microscopy, for example, or by measurements of the thermal conductivity.

The proportion of highly heat-conducting material in the composite material generally amounts to approximately 40 vol % or less up to approximately 80 vol %, more commonly approximately 60 vol %. This is illustrated further in methods 1) through 4), which are discussed in greater detail below.

The thermal conductivity of the composite material is generally higher, the higher the concentration of the highly heat-conducting material. The concentration of the highly heat-conducting material in the various layers may vary, if desired; for example, at least one layer may have a different concentration than the remaining layers.

The individual composite material layers have highly variable layer thicknesses that vary with the specific process variant used (see the process variants 1) through 4) discussed below). In general, they are in range of approximately 20 μm to approximately 2 mm, but optionally may also be lower if very small particles of the highly heat-conducting material are used or even higher in special embodiments such as those discussed below.

The finest structures produced with the method according to the invention usually have dimensions in the size range of a few μm, for example, approximately 20 μm, approximately 40 μm or approximately 50 μm if small particles of the highly heat-conducting material are used. The upper limit on the size of the structures is a question of the size of the production plant. Components with a size of up to 350 mm can currently be produced with embodiments 1 and 4, which are described in conjunction with FIGS. 1 and 4 and can easily be produced in a size of 500 mm or more according to embodiments 2 and 3, which are described below in conjunction with FIGS. 2 and 3.

Four different embodiments 1 through 4 of the method according to the invention as defined above, which are the main ones used, are described below with reference to FIGS. 1 through 4 to prepare the mixture, comprising a molten metal or metal alloy matrix with diamond and/or cBN particles embedded in it.

In a first embodiment of the method, as diagrammed schematically in FIG. 1, a powder bed 1 of a mixture of powdered metal and/or metal alloy particles and particles of the highly heat-conducting material, comprising diamond and/or cubic boron nitride and/or a mechanical alloy of the metal and/or metal alloy and particles of the highly heat-conducting material (referred to below collectively as powdered material 4) is applied locally to a base layer, e.g., to the top layer of several composite material layers 2 that are produced. A movable heat source 6, which is usually computer-controlled, generates a beam or an electric arc 7, which heats the powdered material and the base layer beneath it locally at its surface. A "melt bath" 8 is formed, in which the metal in the powdered material is melted. The composite material layer 2 beneath that is also melted or softens at the contact surface with the powdered material 4. If the heat source 6 and thus the beam or electric arc 7 is moved further in the direction 9 of the powdered material 4, which is not yet melted, the molten powdered material 4 cools off, forming a layer section of solidified composite material 5 having defined dimensions in a predetermined position in the layer 3, which is composed partially of powdered material 4 and the molten composite material 5.

Due to the success of melting and solidification of composite material layers, the component or a section of the component is created layer by layer from the composite material in a near net shape. Portions of the powder which do not melt are removed after the entire production process.

The powdered material 4 can be produced by a simple mechanical mixing, in a drum mixer, for example, of metal or metal alloy and highly heat-conducting material. However, powdered material 4 may also be a powdered so-called mechanical alloy, which can be produced by plastic deformation of the metal or the metal alloy in the presence of the highly heat-conducting material, for example, in a ball mill or an attritor, and in doing so, the particles of the highly heat-conducting material become embedded in this metal or metal alloy. After milling, diamond particles covered mostly with aluminum are obtained. The deposition of powder grains can therefore be prevented, based on the difference in density and size of loose beds of aluminum and diamond (e.g., due to vibrations).

The size of the metal particles or metal alloy particles in the powder bed is generally approximately 4 μm, approximately 6 μm, approximately 10 μm, approximately 20 μm or approximately 30 μm to approximately 100 μm, while the size of the particles of the highly heat-conducting material is generally approximately 4 μm to approximately 200 μm, preferably approximately 60 μm to approximately 200 μm.

The layer thickness of the powder bed 1 and/or of the powdered material 4 is generally in the range from approximately 20 μm to 350 μm, for example, approximately 100 μm to approximately 250 μm, and in particular approximately 200 μm. The layer thickness of the resulting composite material 5 is somewhat but not significantly less than the layer thickness of the powder bed 1.

The rate at which the light source is moved further in the method described above is approximately 500-1000 mm/s, but may also be lower or even much higher, as needed, for example, approximately 1,000,000 mm/s for a magnetically moving electron beam.

The period of time during which the powder is exposed to heating in this process variant is generally in the range of fractions of seconds, e.g., from approximately 1 millisecond to approximately 100, approximately 150 or approximately 200 milliseconds.

The cooling rate of the molten powdered material may be very high in this process variant, e.g., up to approximately 5000° C. per s.

The concentrations of the highly heat-conducting material in the resulting composite material are generally in the range of approximately 40 vol % or less to approximately 70 vol % in this embodiment of the method.

The powder bed may be subjected to a thermal treatment at 30-60% of the solidus line (° C.) before the action of the heat source.

If it is found, for example, by electron microscopy or by some other materials test that the metal matrix is not completely free of cavities after exposure to the heat source and then cooling, or if it does not adhere adequately to the surface of the highly heat-conducting material, then a subsequent heat treatment is performed at atmospheric pressure or in vacuo or hot isostatic pressing as described above is performed. This also applies to the additional embodiments of the method according to the invention described here.

With the embodiment of the method above, very complex components can also be produced even with undercut structures and structures contained only in the interior of the composite material. These structures may have dimensions as small as approximately 20 µm or even less if small particles of the highly heat-conducting material are used.

Figure 2:
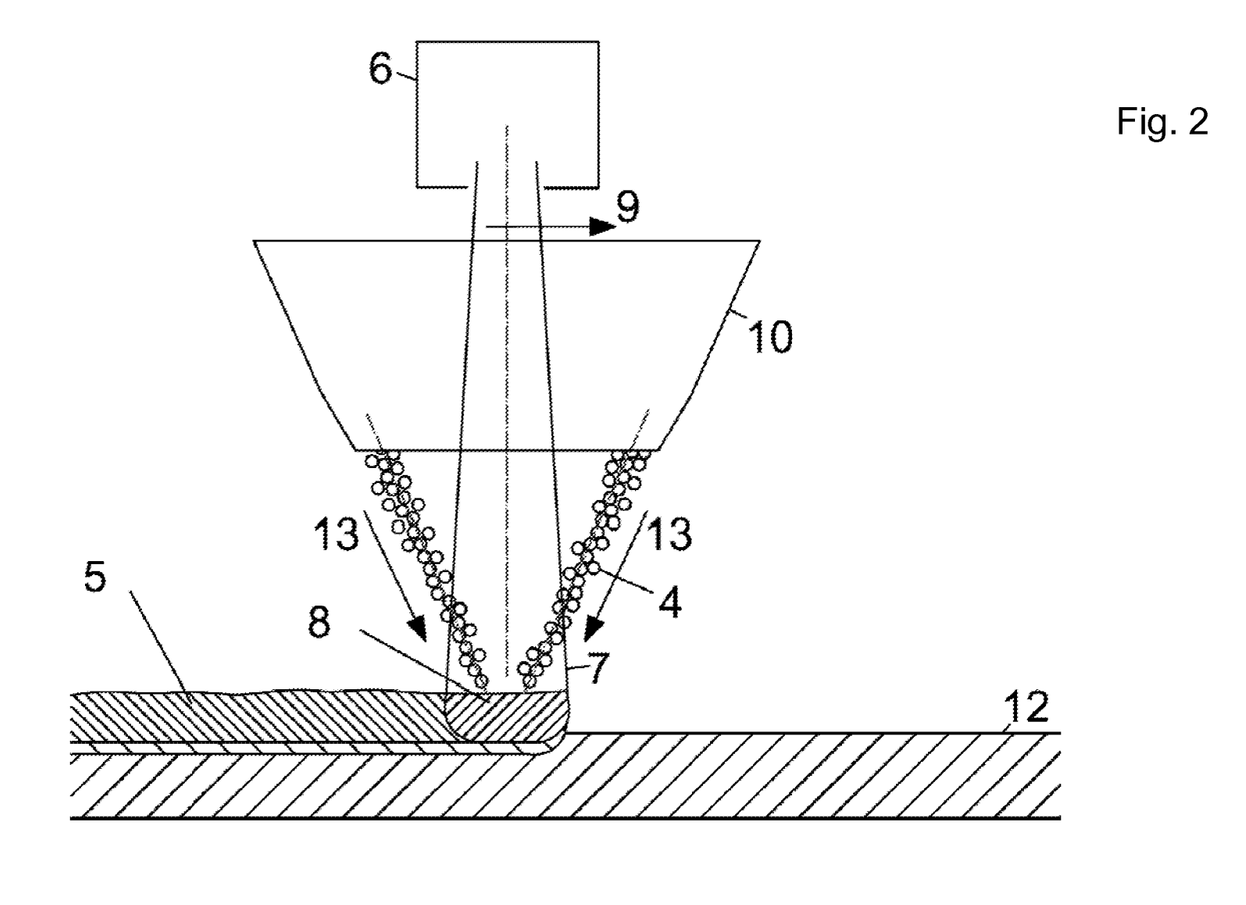
FIG. 2 shows schematically a second embodiment of the method according to the invention.

FIG. 2 shows schematically a second embodiment of the method for layer-by-layer construction of a component in which powdered material 4 is not applied as a powder bed layer but instead is applied locally ("powder feed method"). Another composite material layer 5 is melted on a composite material layer 12 created by melting. Unmelted powdered material 4 is applied through a nozzle 10 in direction 13 to an area, which forms a melt bath 8 under the influence of the beam or the electric arc 7 of the heat source 6, so that the powdered material 4 and/or more specifically its metal content melts in the melt bath. The material layer 12 beneath that is also melted or softened at the surface.

If the beam 7 and/or the nozzle 10 travels further in direction 9, the molten powdered material 4 cools, forming a composite material layer 5. The component or a section of a component of the composite material is produced layer by layer by successively applying and melting the powdered material 4 and then cooling. Any portions of the powder that have not melted are removed.

The nozzle 10 is movable and is connected to the energy source 6 so that both can be moved either alone or together. The powdered material is positioned accurately by applying the powdered material through the nozzle 10.

The powdered material 4 may be supplied variably through the nozzle 10 and may be varied in its composition.

The size of the particles of the powdered material 4 in the process variant with powder application through nozzles is of the same order of magnitude as that in the powder bed process variant (see above).

One or more nozzles may be used for spraying the powdered material (e.g., to apply metal particles and particles of the highly heat-conducting material separately so that their volume ratio can be varied more easily). The nozzle(s) may be arranged coaxially (which is standard) or laterally in relation to the beam 7. The beam 7 may also be arranged with sheathing that is coaxial with the central powder beam 4.

The rate at which the light source and the nozzle(s) are moved further in the powder feed process variant is approximately 10 to approximately 40 mm/s in general but may also be either more or less as needed.

The layer thicknesses of the composite material produced with the powder feed process variant are generally in the range of approximately 20 µm to 2 mm, preferably in the range of approximately 200 to approximately 500 µm and in particular approximately 400 µm.

The periods of time in which the powder is exposed to heating in this embodiment are generally in the range of approximately one-tenth of a second up to approximately one second. The cooling rate of the molten powdered material may be high, for example, up to approximately 3000° C. per s.

The concentrations of the highly heat-conducting material and the resulting composite material are generally in the range of approximately 40 vol % or less to approximately 70 vol % in the powder feed process variant.

A versatile complexity of the structure of the components produced can also be achieved with the powder feed process variant; for example, internal structures can be produced easily, and even very fine structures like those in the powder bed process variant can also be produced easily.

Figure 3:
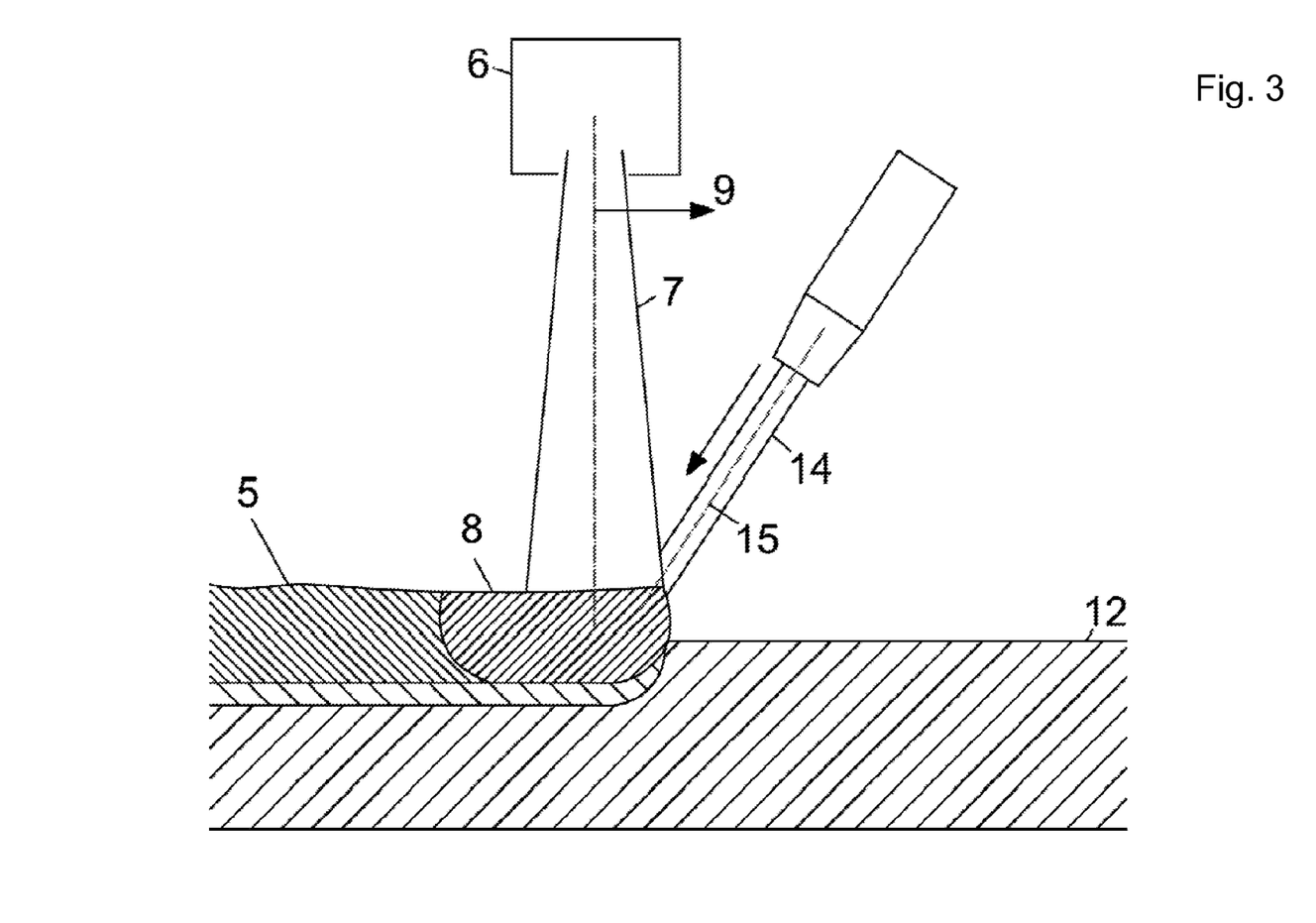
FIG. 3 shows schematically a third embodiment of the method according to the invention.

FIG. 3 shows schematically a third embodiment of the method for construction of a component layer by layer in which a hollow metal wire or a metal tube 14 is used to apply the powdered material, the metal wire or metal tube containing particles 15 of the highly heat-conducting material or the mechanical alloy of metal or alloy and highly heat-conducting material as described above. The wire generally has a diameter of approximately 1 mm to approximately 2 mm or even approximately 3 mm. Oval wire, flat wires or rectangular wires may also be used. The thickness is then generally up to approximately 3 mm and the width is up to approximately 8 mm. The tube has a diameter of approximately 2 mm or approximately 3 mm to 4 mm in general, but the tube may optionally also have a larger diameter.

The beam or electric arc 7 of the heat source 6 strikes the wire or the tube 14 and melts it. The particles 15 of the highly heat-conducting material or the mechanical alloy in the wire or tube 14 drop onto the base layer 12 and together with the metal of the wire or the tube in the heat of the beam 7 they form a melt bath 8 in which the metal matrix encloses the highly heat-conducting material. The composite material layer 12 is also melted or softened at the surface.

If the beam 7 travels further in direction 9, the material in the melt bath 8 cools, forming a layer 5 of composite material.

The size of the particles 15 of the highly heat-conducting material or the mechanical alloy in the wire or tube 14 is generally in the range of approximately 20 µm to approximately 400 µm.

The rate at which the light source 6 and the wire or the tube 14 are moved further is approximately 10 to approximately 40 mm/s in general, but it may also be lower as needed.

The layer thicknesses of the process variants discussed here are generally in the range of approximately 1 mm to approximately 2 mm or approximately 3 mm or on the order of magnitude of the dimensions of the cross section of the wire or tube.

The periods of time during which the material in the melt bath is exposed to heating are generally in the range from a tenth of a second up to approximately one or two seconds. The cooling rate of the melt is lower than in the process variants discussed above and is generally approximately 500° C. per s to approximately 2000° C. per s.

The concentrations of the highly heat-conducting material in the resulting composite material are generally in the range of approximately 40 vol % or less to approximately 60 vol %.

The process variant mentioned here is especially suitable for the production of large near net shape structures.

Figure 4:
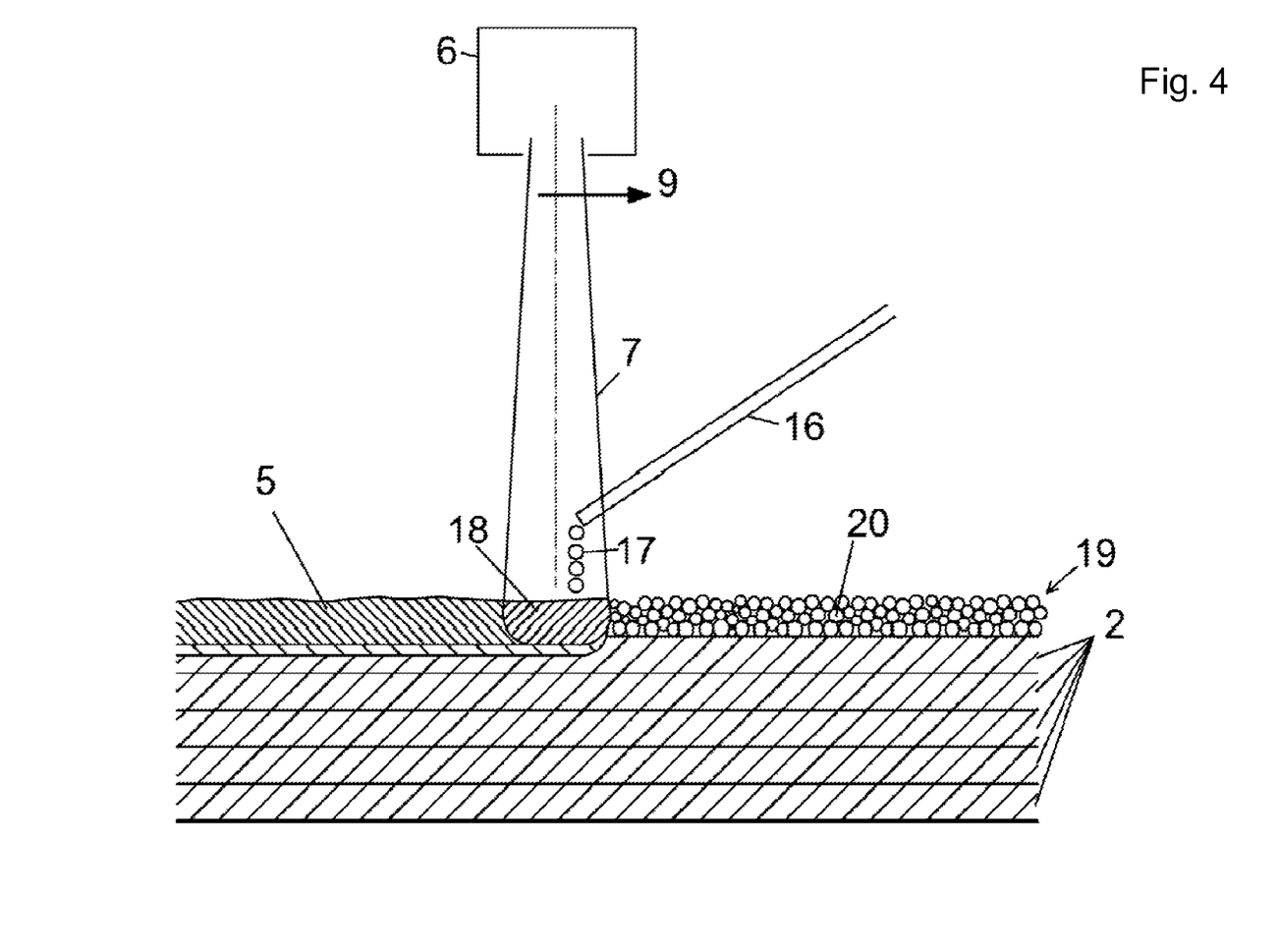
FIG. 4 shows schematically a fourth embodiment of the method according to the invention.

FIG. 4 shows schematically a local infiltration method as the fourth embodiment of the method for layer-by-layer construction of a component by melting a metal wire 16 in the beam or the electric arc 7 of a heat source 6. The metal melt 17 locally infiltrates a powder bed 19 of particles of highly heat-conducting material 20 on the top layer of the composite material layers 2 through gravity. A molten matrix 18 enclosing the particles of the highly heat-conducting material 20 is formed. The composite material layer beneath that is also partially melted or softened at the surface.

If the beam 7 travels further in direction 9, the matrix 18 enclosing the molten highly heat-conducting material cools down, forming a layer 5 of composite material. Due to the creation of composite material layers one after the other, the component or a section of the component is produced in a near net shape from the composite material. Unmelted powder particles are then removed.

Figure 1:
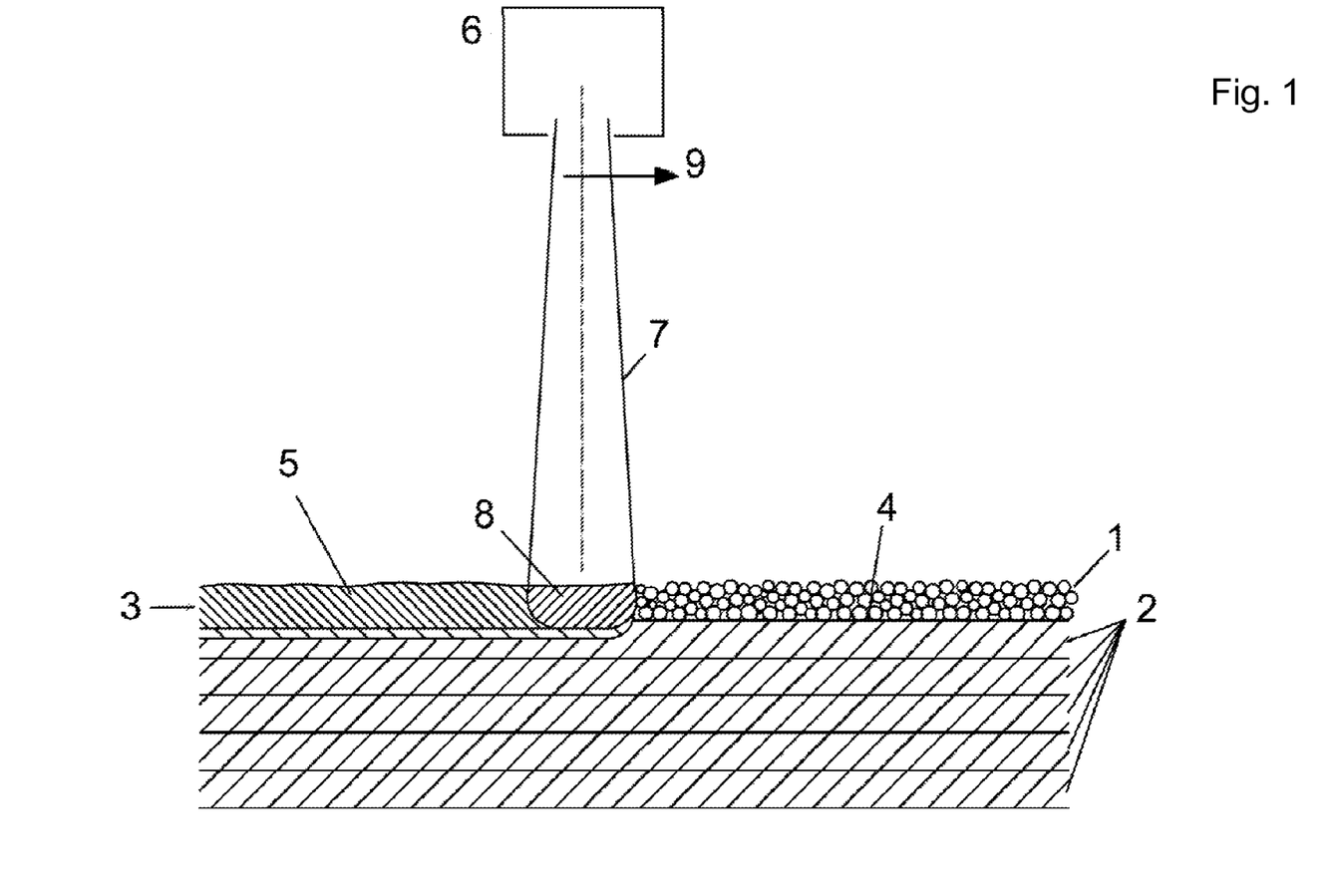
FIG. 1 shows schematically a first embodiment of the method according to the invention.

The size of the particles of the highly heat-conducting material 20 is in the same range as that in the powder bed process variant of FIG. 1 described above.

The rate at which the light source 6 and the wire 16 are moved further is generally up to approximately 50 mm/s at most.

The layer thickness of the powder bed 19 of particles of the highly heat-conducting material 20 is generally in the range of approximately 20 µm to approximately 350 µm, for example, approximately 100 µm to approximately 250 µm, and in particular approximately 200 µm. The layer thickness of the resulting composite material 5 is slightly but not significantly less than the layer thickness of the powder bed 19.

The periods of time in which the material in the melt bath is exposed to heating is generally in the range of approximately one-tenth of a second to approximately one second or approximately two seconds. The cooling rate of the melt is generally approximately 500° C. per s to approximately 2000° C. per s.

The concentration of the highly heat-conducting material in the resulting composite material may be very high in the process variant with local infiltration and is generally in the range of approximately 50 vol % to approximately 70 vol % or even up to approximately 80 vol %.

For this reason, the process variant of local infiltration is advantageous if the greatest possible increase in thermal conductivity of a metal matrix is of primary interest.

It should also be pointed out here that applying an additional layer section of the composite material to a base layer comprising a previously applied layer section of the composite material may include any process variant of the preceding process variants 1 through 4. Likewise, abutting or separate layer sections of the composite material can be produced by different process variants on one and the same base layer.

In general, the lowest base layer of the component does not contain a composite material but instead is the construction platform on which the component is erected and is often separated from the component after it has been completed if the lowest base layer is not part of the target geometry.

Figure 5:
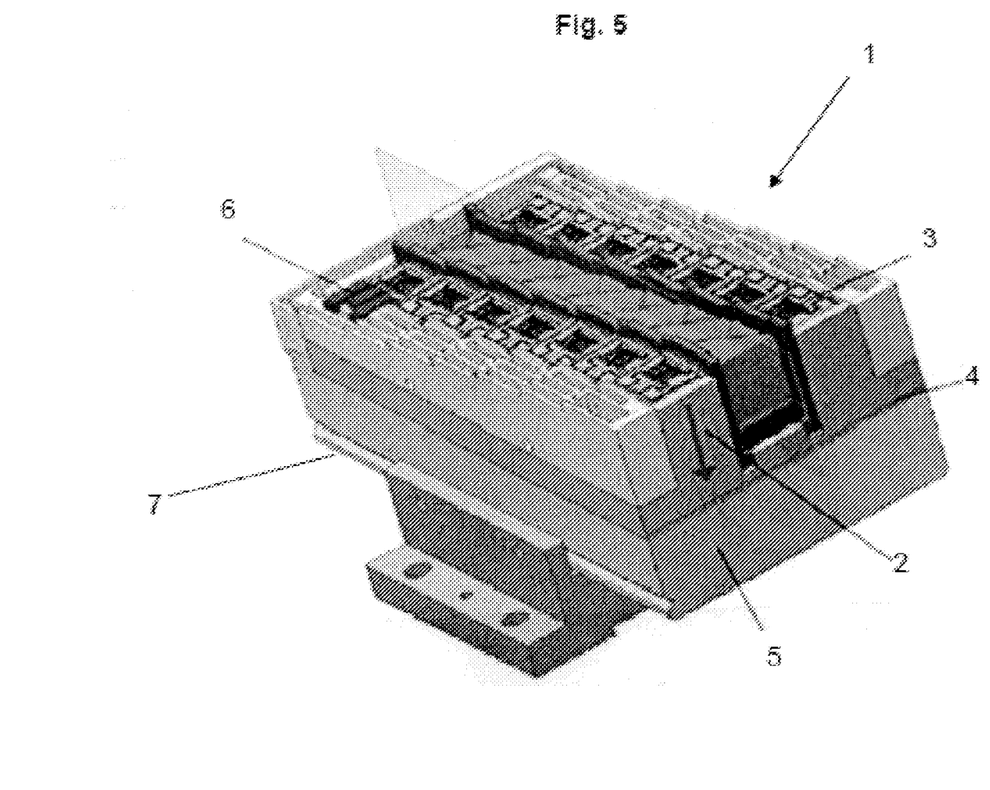
FIG. 5 shows a component of a laser transmitter using a component according to the invention as the heat sink for the laser diodes.

FIG. 5 shows an industrial component 1 of laser transmitter, in which a heat sink 2 manufactured from the composite material according to the invention dissipates the heat generated by the laser diodes 3 to a base plate 5 with a cooling system by way of a heat-conducting interface or a highly heat-conducting layer 4. Electric contacts are labeled as 6. The base area 7 of the component is 135 mm×70 mm.

The near-net-shape heat-conducting components according to the invention, which can be obtained by the generative manufacturing method according to the invention, may be made entirely of the composite material described above.

If, in the event the highly heat-conducting material does not comprise cubic boron nitride, at least one additional layer section of composite material is applied to a base layer comprising the layer section of the composite material applied previously, and if the lowest base layer, as long as it does not comprise any composite material, i.e., the construction platform is separated from the component otherwise consisting entirely of the composite material, then the component forms a composite material according to the invention which is novel because of the resulting highly heat-conducting material or because of its layer structure which is characteristic of the microstructure of the composite material.

However, the components may also contain other materials, for example, pure metals or metal alloys. Components of such mixed materials can be manufactured by generative methods by forming layers which consist partially of the composite material and partially of metal or metal alloys or are constructed by generative processes on basic structures of metal or metal alloys.

The components and composite materials according to the invention are used primarily as high-technology cooling elements or heat sinks for special cooling requirements.

In addition to the high thermal conductivity in comparison with the metal or metal alloy of the composite material matrix, the components according to the invention may also have other advantageous properties in comparison with the metal or the metal alloy of the composite material matrix, for example, they may:

have a lower thermal expansion coefficient,
have an improved mechanical stability,
have improved damping properties,
have a higher stiffness, and
have a lower density.

Thus, they have a potential for a large field of use, in particular in aviation and space travel.

The following examples illustrate the invention further without restricting it.

EXAMPLE 1

Milling Aluminum-Diamond Powder

Diamond powder (size 70-90 µm) and pure aluminum powder (grain size <45 µm) are milled for one hour at 280 revolutions per minute in a planetary mill with a radius of 12.5 cm and a ball/powder weight ratio of 2:1 The milling balls and milling cups are made of cubic $ZrO_2$ (stabilized with $Y_2O_3$). Since aluminum is deposited on the balls and milling cups, the aluminum must be added in amounts greater than the theoretical amount in order to arrive at the desired aluminum-diamond mixture composition. The milled powder may then be used directly for generative manufacturing or preferably may be screened first to remove large particles.

EXAMPLE 2

Production of Aluminum-Diamond Thermal Conductivity Samples in a Powder Bed

Figure 6:
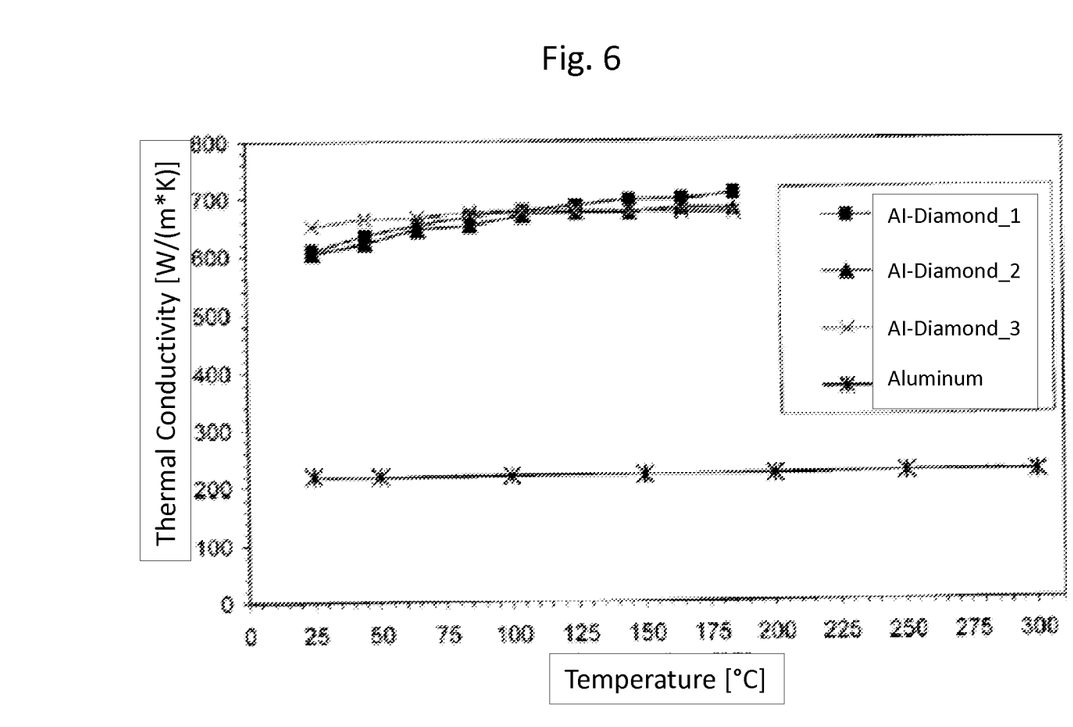
FIG. 6 shows the thermal conductivity values of aluminum-diamond samples produced according to the invention in comparison with pure aluminum.

In the following example, thermal conductivity samples of 70 vol % diamond powder (size 70-90 µm) and 30 vol % pure aluminum (grain size <45 µm) were manufactured in a laser-based powder bed process. The laser power was 300 W and the scan rate was 800 mm/s. The samples had a diameter of approximately 14 mm and were approximately 5 mm thick. They were then machined to a diameter 12.3 mm and a thickness of 2.6 mm and their surfaces were polished. As shown in FIG. 6, the thermal conductivity values of the aluminum-diamond samples are significantly higher in comparison with those of pure aluminum.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a component having increased thermal conductivity through layer-by-layer construction, wherein least one section of the component is constructed by performing at least once a step comprising:
   a) applying a layer section having predetermined dimensions of a composite material of a metal and/or a metal alloy and particles of a highly heat-conducting material, comprising diamond and/or cubic boron nitride, in a predetermined area on a base layer by melting the metal or the metal alloy by a heat source in such a way that the metal and/or metal alloy forms, within the predetermined dimensions, a cohesive matrix in which particles of the highly heat-conducting material are embedded, and then cooling, wherein the metal of the metal and/or metal alloy is Al or Mg, and wherein a size of the particles of the highly heat-conducting material, comprising diamond and/or cubic boron nitride is in the range of approximately 6 μm to approximately 250 μm, wherein a size distribution is bimodal or trimodal.

2. The method according to claim 1, wherein the application of a layer section to the base layer involves one of the following steps 1) through 4):

1) supplying a powder bed of a mixture of powdered metal and/or metal alloy particles and particles of the highly heat-conducting material, comprising diamond and/or cubic boron nitride, and/or a mechanical alloy of the metal and/or metal alloy and particles of the highly heat-conducting material on the base layer and melting the metal and/or metal alloy in subarea of the powder bed having predetermined dimensions by means of a heat source, in such a way that the metal and/or metal alloy forms, within the predetermined dimensions, a cohesive matrix in which particles of the highly heat-conducting material are embedded, and then cooling;

2) supplying powdered metal and/or metal alloy particles and particles of the highly heat-conducting material, comprising diamond and/or cubic boron nitride and/or a powdered mechanical alloy of the metal and/or metal alloy and particles of the highly heat-conducting material by one or more nozzles onto a predetermined area of the substrate and melting the metal and/or metal alloy by means of a heat source in such a way that the metal and/or metal alloy forms, within the predetermined dimensions, a cohesive matrix in which particles of the highly heat-conducting material are embedded, and then cooling;

3) applying a heat source to one end of a hollow metal and/or metal alloy wire or tube in whose cavity particles of the highly heat-conducting material, comprising diamond and/or cubic boron nitride and/or the mechanical alloy of the metal and/or metal alloy and particles of the highly heat-conducting material are arranged in such a way that the portion of the metal and/or metal alloy wire or tube on which the heat source acts is melted and forms, within a predetermined area, a cohesive matrix in which particles of the highly heat-conducting material are embedded, and then cooling; and 4) supplying a powder bed of powdered particles of the highly heat-conducting material, comprising diamond and/or cubic boron nitride, and of a wire or rod of the metal or the metal alloy, applying a heat source to one end of the wire or rod in such a way that the portion of the wire or rod on which the heat source acts is melted and, as a melt, infiltrates a predetermined section of the powder bed of the highly heat-conducting material and surrounds its particles in the form of a cohesive matrix, and then cooling, wherein the metal of the metal and/or metal alloy is Al or Mg.

3. The method according to claim 2, further comprising:
applying, at least once, an additional layer section of the composite material on a base layer comprising a section of layer of the composite material applied previously using step a) or any step of steps 1) through 4).

4. The method according to claim 2, wherein the heat source is movable and step a) or one of steps 1) through 4) is performed on the same base layer with continuous power output by the heat source until achieving a predetermined dimension of the layer section, or in the case of a pulsed power output by the heat source, the step(s) is/are repeated until a predetermined dimension of the layer section is achieved.

5. The method according to claim 1, wherein the size of the particles of the highly heat-conducting material, comprising diamond and/or cubic boron nitride is in the range of approximately 60 μm to approximately 200 μm.

6. The method according to claim 1, wherein the proportion of highly heat-conducting material in the composite material thus manufactured is approximately 40 vol % to approximately 80 vol %.

7. The method according to claim 1, wherein a thickness of the layer of the composite material thereby produced is approximately 20 μm to approximately 2 mm.

8. The method according to claim 1, wherein the heat source is selected from a laser, a UV light, a particle beam, an electron beam and/or an electric arc.

9. The method according to claim 1, wherein the highly heat-conducting material consists of particles of diamond and/or cubic boron nitride, which have optionally been etched or roughened by oxidation and/or the particles containing diamond and/or cubic boron nitride contained in the highly heat-conducting material are coated.

10. The method according to claim 9, wherein the particles containing diamond and/or cubic boron nitride contained in the highly heat-conducting material are coated with SiC or AlN.

11. The method according to claim 1, wherein the applied composite material is also treated further by heat under atmospheric pressure or in vacuo or under an elevated pressure.

12. The method according to claim 1, wherein the method is performed at room temperature or partially or entirely at an elevated temperature within approximately 30% to approximately 60% of the solidus line (° C.).

13. A method for manufacturing a composite material consisting of a metal and/or a metal alloy and particles of highly heat-conducting material, comprising diamond and/or cubic boron nitride, the method comprising:

a) applying a layer section having predetermined dimensions of the composite material of the metal and/or the metal alloy and the particles of a highly heat-conducting material, comprising diamond and/or cubic boron nitride, in a predetermined area on a base layer by melting the metal or the metal alloy by a heat source in such a way that the metal and/or metal alloy forms, within the predetermined dimensions, a cohesive matrix in which particles of the highly heat-conducting material are embedded, and then cooling, wherein the metal, unless it is an ingredient of the metal alloy, is not selected from the alkali metals and calcium, strontium, barium or radium, wherein a size of the particles of the highly heat-conducting material, comprising diamond and/or cubic boron nitride is in the range of approximately 6 μm to approximately 250 μm, wherein a size distribution is bimodal or trimodal, wherein the application of a layer section to the base layer involves one of the following steps 1) through 4)

1) supplying a powder bed of a mixture of powdered metal and/or metal alloy particles and particles of the highly heat-conducting material, comprising diamond and/or cubic boron nitride, and/or a mechanical alloy of the metal and/or metal alloy and particles of the highly heat-conducting material on the base layer and melting the metal and/or metal alloy in subarea of the powder bed having predetermined dimensions by means of a heat source, in such a way that the metal and/or metal alloy forms, within the predetermined dimensions, a cohesive matrix in which particles of the highly heat-conducting material are embedded, and then cooling;

2) supplying powdered metal and/or metal alloy particles and particles of the highly heat-conducting material, comprising diamond and/or cubic boron nitride and/or a powdered mechanical alloy of the metal and/or metal alloy and particles of the highly heat-conducting material by one or more nozzles onto a predetermined area of the substrate and melting the metal and/or metal alloy by means of a heat source in such a way that the metal and/or metal alloy forms, within the predetermined dimensions, a cohesive matrix in which particles of the highly heat-conducting material are embedded, and then cooling;

3) applying a heat source to one end of a hollow metal and/or metal alloy wire or tube in whose cavity particles of the highly heat-conducting material, comprising diamond and/or cubic boron nitride and/or the mechanical alloy of the metal and/or metal alloy and particles of the highly heat-conducting material are arranged in such a way that the portion of the metal and/or metal alloy wire or tube on which the heat source acts is melted and forms, within a predetermined area, a cohesive matrix in which particles of the highly heat-conducting material are embedded, and then cooling; and 4) supplying a powder bed of powdered particles of the highly heat-conducting material, comprising diamond and/or cubic boron nitride, and of a wire or rod of the metal or the metal alloy, applying a heat source to one end of the wire or rod in such a way that the portion of the wire or rod on which the heat source acts is melted and, as a melt, infiltrates a predetermined section of the powder bed of the highly heat-conducting material and surrounds its particles in the form of a cohesive matrix, and then cooling; and wherein the metal of the metal and/or metal alloy is Al or Mg, and wherein the base layer that does not consist of the composite material is subsequently separated so that in the case in which the highly heat-conducting material does not comprise cubic boron nitride, at least one additional layer section of composite material is applied to a base layer comprising the layer section of composite material applied previously.

14. A near-net shape heat-conducting component manufactured by performing at least once a step comprising:
a) applying a layer section having predetermined dimensions of a composite material of a metal and/or a metal alloy and particles of a highly heat-conducting material, comprising diamond and/or cubic boron nitride, in a predetermined area on a base layer by melting the metal or the metal alloy by a heat source in such a way that the metal and/or metal alloy forms, within the predetermined dimensions, a cohesive matrix in which particles of the highly heat-conducting material are embedded, and then cooling,
wherein the metal, unless it is an ingredient of the metal alloy, is not selected from the alkali metals and calcium, strontium, barium or radium,
wherein the metal of the metal and/or metal alloy is Al or Mg, and wherein a size of the particles of the highly heat-conducting material, comprising diamond and/or cubic boron nitride is in the range of approximately 6 μm to approximately 250 μm, wherein a size distribution is bimodal or trimodal.

15. A composite material of a metal and/or a metal alloy and particles of a highly heat-conducting material, comprising diamond and/or cubic boron nitride, that can be manufactured by a method comprising:
a) applying a layer section having predetermined dimensions of the composite material of the metal and/or the metal alloy and the particles of a highly heat-conducting material, comprising diamond and/or cubic boron nitride, in a predetermined area on a base layer by melting the metal or the metal alloy by a heat source in such a way that the metal and/or metal alloy forms, within the predetermined dimensions, a cohesive matrix in which particles of the highly heat-conducting material are embedded, and then cooling, wherein the metal, unless it is an ingredient of the metal alloy, is not selected from the alkali metals and calcium, strontium, barium or radium, wherein a size of the particles of the highly heat-conducting material, comprising diamond and/or cubic boron nitride is in the range of approximately 6 μm to approximately 250 μm, wherein a size distribution is bimodal or trimodal, wherein the application of a layer section to the base layer involves one of the following steps 1) through 4)

1) supplying a powder bed of a mixture of powdered metal and/or metal alloy particles and particles of the highly heat-conducting material, comprising diamond and/or cubic boron nitride, and/or a mechanical alloy of the metal and/or metal alloy and particles of the highly heat-conducting material on the base layer and melting the metal and/or metal alloy in subarea of the powder bed having predetermined dimensions by means of a heat source, in such a way that the metal and/or metal alloy forms, within the predetermined dimensions, a cohesive matrix in which particles of the highly heat-conducting material are embedded, and then cooling;

2) supplying powdered metal and/or metal alloy particles and particles of the highly heat-conducting material, comprising diamond and/or cubic boron nitride and/or a powdered mechanical alloy of the metal and/or metal alloy and particles of the highly heat-conducting material by one or more nozzles onto a predetermined area of the substrate and melting the metal and/or metal alloy by means of a heat source in such a way that the metal and/or metal alloy forms, within the predetermined dimensions, a cohesive matrix in which particles of the highly heat-conducting material are embedded, and then cooling;

3) applying a heat source to one end of a hollow metal and/or metal alloy wire or tube in whose cavity particles of the highly heat-conducting material, comprising diamond and/or cubic boron nitride and/or the mechanical alloy of the metal and/or metal alloy and particles of the highly heat-conducting material are arranged in such a way that the portion of the metal and/or metal alloy wire or tube on which the heat source acts is melted and forms, within a predetermined area, a cohesive matrix in which particles of the highly heat-conducting material are embedded, and then cooling; and 4) supplying a powder bed of powdered particles of the highly heat-conducting material, comprising diamond and/or cubic boron nitride, and of a wire or rod of the metal or the metal alloy, applying a heat source to one end of the wire or rod in such a way that the portion of the wire or rod on which the heat source acts is melted and, as a melt, infiltrates a predetermined section of the powder bed of the highly heat-conducting material and surrounds its particles in the form of a cohesive matrix, and then cooling; and wherein the metal of the metal and/or metal alloy is Al or Mg, and wherein the base layer that does not consist of the composite material is subsequently separated so that in the case in which the highly heat-conducting material does not comprise cubic boron nitride, at least one additional layer section of composite material is applied to a base layer comprising the layer section of composite material applied previously.

\* \* \* \* \*